United States Patent
Smith

[15] 3,645,603
[45] Feb. 29, 1972

[54] LIGHT MODULATION IN OPTIC FIBER
[72] Inventor: Luther W. Smith, 5 Bridges Road, Brimfield, Mass. 01010
[22] Filed: Sept. 24, 1969
[21] Appl. No.: 860,748

[52] U.S. Cl. .................. 350/149, 350/96 R, 350/96 WG, 350/160
[51] Int. Cl. ...................... G02f 1/24, G02b 5/14
[58] Field of Search ............... 350/96, 96 B, 149, 160, 161

[56] References Cited
UNITED STATES PATENTS
3,030,852   4/1962   Courtney-Pratt .................. 350/96 B

*Primary Examiner*—David H. Rubin
*Attorney*—Lane, Aitken, Dunner & Ziems and William C. Nealon

[57] ABSTRACT

Light is modulated in an optic fiber by applying compression across diameters of the fiber angularly displaced from one another and axially displaced from one another along the fiber. Independent phase modulation is achieved by varying the compression applied across the diameters equally and with the same direction. Independent amplitude modulation is achieved by varying the compression applied across the diameters equally and with opposite polarity directions.

14 Claims, 4 Drawing Figures

Patented Feb. 29, 1972

3,645,603

INVENTOR
LUTHER W. SMITH

BY Lane, Aitken, Dunner + Ziems
ATTORNEYS

LIGHT MODULATION IN OPTIC FIBER

BACKGROUND OF THE INVENTION

This invention relates to light modulation and, more particularly, to a method and apparatus for independently modulating the amplitude and phase of coherent light by means of an optical fiber.

In communication and data processing the use of light energy signals has become an important means of representing data and information. One way in which light energy can be made to represent data is to modulate the amplitude or phase of coherent light. Such light modulation has been achieved by transmitting coherent light through a fiber using only the lowest order waveguide dielectric mode of transmission and subjecting the optic fiber to stress such as hydrostatic pressure, tension along its length, or compression across its diameter. The most promising of these methods of applying mechanical stress to the optical fiber to achieve modulation is compressing the fiber across its diameter. Such compression causes the fiber to become birefringent and both the amplitude and the phase of the coherent light transmitted through the fiber are modulated in accordance with the magnitude of the applied compression. However, prior to the present invention independent modulation of the phase and amplitude could not be achieved by compression across the diameter of the fiber. Such independent modulation however is achieved by the system of the present invention.

SUMMARY OF THE INVENTION

In accordance with the present invention the coherent light is first passed through a polarizer before being transmitted through the optical fiber in order to polarize the light travelling through the fiber at a predetermined angle. Two pairs of transducers are arranged to apply compression across diameters of the fiber at different positions along the length of the fiber. The two diameters across which compression is applied are selected to be at right angles to one another. An analyzer is positioned at the output end of the fiber to analyze the transmitted light at a given angle of polarization. If the two pairs of transducers are controlled so that they change the compression of the fiber the same amount precisely in synchronism with one another, then the phase of the light passing through the analyzer will be modulated but the amplitude of the light passing through the analyzer will not be varied. If the two pairs of transducers are controlled so that the changes in the compression applied by the two transducers are equal and opposite then the amplitude of the light passing through the analyzer will be modulated and the phase will be constant. Thus the system of the present invention achieves independent phase and amplitude modulation.

Accordingly, an object of the present invention is to modulate the phase of coherent light independently of any amplitude modulation.

Another object of the present invention is to modulate the amplitude of coherent light independently of any phase modulation.

A further object of the present invention is to independently modulate both the amplitude and phase of coherent light.

A still further object of the present invention is to provide a system for independently modulating the amplitude and phase of coherent light passing through an optical fiber.

A still further object of the present invention is to achieve independent modulation of amplitude and phase of coherent light in a system in which the light is modulated in an optic fiber by means of compression across the diameter of the fiber.

Further objects and advantages of the present invention will become readily apparent as the following detailed description of the invention unfolds.

DESCRIPTION OF THE PREFERRED EMBODIMENTS

Figure 1:
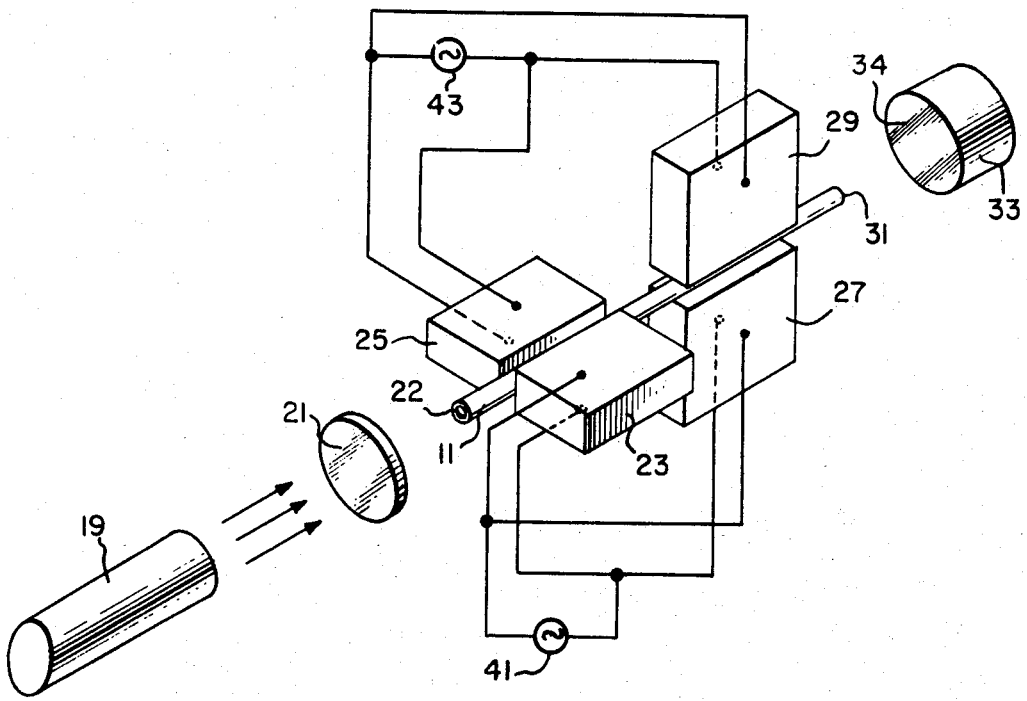
FIG. 1 schematically illustrates the system of the present invention.
Figure 2:
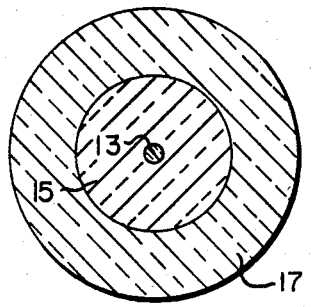
FIG. 2 is an enlarged cross-sectional view taken through the rod containing the optic fiber in the system of FIG. 1.

The system of the present invention as shown in FIG. 1 comprises a rod 11 which contains an optic fiber. The system modulates independently the phase and amplitude of coherent light propagated through the optic fiber. In FIG. 2, which is an enlarged cross-sectional view through the rod 11, the optic fiber is designated by the reference number 13. The optic fiber 13, which is 2.5 microns in diameter, is provided with glass cladding comprising an inner layer 15 of clear glass having an outside diameter of 25 microns and an outer layer 17 of blue glass with a refractive index close to that of the clear glass layer and having an outside diameter of 50 microns.

The structure of the rod 11 is designed so that only the lowest order $HE_{11}$ waveguide dielectric mode is propagated in the fiber. The limitation of the propagation to this mode is achieved by making the parameter $\mu_o$ in the following equation less than 2.4:

$$(1) \qquad \mu_0 = \frac{2\pi a}{\lambda} \sqrt{n_1^2 - n_2^2}$$

in which a is the diameter of the fiber 13, $n_1$ is the index of refraction of the fiber 13, $n_2$ is the index of refraction of the cladding 15, and $\lambda$ is the wavelength of the coherent light which is introduced into the optic fiber. In the preferred embodiment the coherent light is provided by He-Ne laser 19 and has a wavelength of 6,328 angstroms.

It is important that the cladding not propagate any light to interfere with the modulated light which is transmitted from the far end of the optical fiber. The blue glass layer 17 absorbs any light which otherwise would propagate in the cladding.

As shown in FIG. 1, a light beam of coherent light with a wavelength of 6328 angstroms produced by the He-Ne laser 19 is passed through a polarizer 21 and then into the end 22 of the optic fiber contained in the center of the rod 11. The polarizer 21 only transmits laser light with a predetermined angle of polarization so that the coherent light entering the end of the optic fiber in the rod 11 is all polarized in the same direction. A first pair of piezoelectric transducers 23 and 25 are positioned to apply compressive stress to the rod 11 across the diameter thereof and thus apply compressive stress across the diameter of the optic fiber contained in the center of the rod 11. A second pair of piezoelectric transducers 27 and 29 are also positioned to apply compressive stress across a diameter of the rod and thus across a diameter of the optic fiber at a position axially spaced along the rod 11 from the position at which the transducers 23 and 25 apply compressive stress. The transducers 27 and 29 are arranged so that the diameter across which they apply compressive stress is perpendicular to the diameter across which the transducers 23 and 25 apply compressive stress. The diameters of the optic fiber across which the pairs of transducers apply compression are referred to as the axes of compression.

As pointed out above, the construction of the optic fiber and the cladding comprising the rod 11 is such that only the $HE_{11}$ mode of transmission will be supported in the optic fiber 13. The light transmitted in this mode through the optic fiber upon leaving the far end 31 of the rod is received by an analyzer 33 including a polarizer 34, which transmits only that component of the received light polarized at a predetermined angle. The analyzer 33 is operable to convert the amplitude modulation and the phase modulation of the component transmitted by the polarizer 34 into corresponding electrical signals.

The polarizer 21 transmits light polarized at an angle displaced from the axes of compression, and preferably at 45° with respect to the axes of compression. The polarization angle of the polarizer 34 is also displaced with respect to the axes of compression and is preferably at the same angle as that of the polarizer 21.

When an optical fiber is compressed across its diameter, the phase of coherent light travelling through the fiber polarized parallel to the axis across which the compression is applied is retarded by an amount which varies with the magnitude of the applied compression. The phase of the coherent light travelling through the fiber polarized perpendicular to the axis across which the compression is applied will be retarded by a greater amount which also varies with the applied compression. In this manner, the compression applied across the diameter of the optic fiber makes the optic fiber birefringent.

The polarized light travelling through the optic fiber can be divided into two components which shall be designated the X-component and the Y-component. The X-component is defined as being parallel to the axis across which the transducers 23 and 25 apply compression and accordingly is perpendicular to the axis across which the transducers 27 and 29 apply compression. The Y-component accordingly is perpendicular to the axis across which the transducers 23 and 25 apply compression and is parallel to the axis across which the transducers 27 and 29 apply compression. The retardation of the X-component as a result of the compression applied by the transducers 23 and 25 may be expressed as $\delta_1$ and the retardation of the Y-component as a result of the compression may be expressed as $\delta_1 + \Phi_1$. Similarly the retardation of the Y-component as a result of the compression applied by the transducers 27 and 29 may be expressed as $\delta_2$ and the retardation of the X-component as a result of this compression may be expressed as $\delta_2 + \Phi_2$. The values $\delta_1, \delta_2, \Phi_1$ and $\Phi_2$ are all phase angles which vary directly with the magnitude of the applied compression. The total phase retardation of the X-component provided by both pair of transducers is $\delta_1 + \delta_2 + \Phi_2$ and the total retardation of the Y-component by both transducers is $\delta_1 + \Phi_1 + \delta_2$. If the amplitude of the polarized component introduced into the front end 22 of the optic fiber is P then the amplitude of the X-component before passing between the first pair of transducers 23 and 25 is $P \cos\theta_1$ in which $\theta_1$ is the angle between the angle of polarization of the polarizer 21 and the axis across which the transducers 23 and 25 apply compression. The amplitude of the Y-component in the optic fiber before passing through the transducers 23 and 25 may be expressed as $P \sin\theta_1$. In the $HE_{11}$ mode of X- and Y-components may be assumed to be sinusoidal. Accordingly, these components before passing through the first pair of transducers may be expressed as follows:

2. $X = P\cos\theta_1 e^{i\omega t}$ and

3. $Y = P\sin\theta_1 e^{i\omega t}$ in which $\omega$ is the frequency of the light transmitted through the fiber. The X-component after passing through the pair of transducers 27 and 29 can be expressed as:

4. $X = P\cos\theta_1 e^{i(\delta_1 + \delta_2 + \phi_2 - \omega t)}$ and the Y-component can be expressed as:

5. $Y = P\sin\theta_1 e^{i(\delta_1 + \phi_1 + \delta_2 - \omega t)}$

In the above equations the factor in the exponent of the mathematical constant e multiplied times $i$ represent the phase of the signal. Since at a given point the phase of the signal will continuously vary with time both of the exponents contain the time factor $-\omega t$. Since the time factor $\omega t$ is the same for both components, it does not affect the relative phases of the two components and can be omitted for purposes of this analysis. With the time factor omitted, equations (4) and (5) reduce to:

6. $X = P\cos\theta_1 e^{i(\delta_1 + \delta_2 + \phi_2)}$ and

7. $Y = P\sin\theta_1 e^{i(\delta_1 + \phi_1 + \delta_2)}$ respectively. If the polarizer 34 of the analyzer 33 is positioned at an angle $\theta_2$ with respect to the axis across which the transducers 23 and 25 apply compression then the signal passing through this polarizer can be expressed as follows:

8. $A = X\cos\theta_2 + Y\sin\theta_2$ in which X and Y are the values of these components upon entering the polarizer 34. Substituting in equation (8) the expressions for X and Y in equations (6) and (7) the following equation results for the signal passing through the polarizer of the analyzer 33:

9. $A = P\cos\theta_1 e^{i(\delta_1 + \delta_2 + \phi_2)} \cos\theta_2 + P\sin\theta_1 e^{i(\delta_1 + \phi_1 + \delta_2)} \sin\theta_2$ which can be rewritten as:

10. $A = Pe^{i(\delta_1 + \delta_2)} [\cos\theta_1 \cos\theta_2 e^{i\phi_2} \sin\theta_1 \sin\theta_2 e^{i\phi_1}]$ Under conditions of no strain in which $\delta_1, \delta_2, \Phi_1$ and $\Phi_2$ all equal 0, Equation (10) reduces to:

11. $A = P\cos(\theta_1 - \theta_2)$

This value for A is defined as $A_0$. If $\theta_1$ equals $\theta_2$, then $A_0$ equals P. If $\theta_1$ and $\theta_2$ are perpendicular to one another or in other words displaced from one another by 90°, $A_0$ equals 0.

If the pairs of transducers are controlled so that each pair applies the same compression to the rod then $\delta_2$ will equal $\delta_1$ and $\Phi_2$ will equal $\Phi_1$. In this case $\delta_1$ and $\Phi_1$ can be substituted for $\delta_2$ and $\Phi_2$ in equation (10) and the light passing through the polarizer of the analyzer 33 can be expressed as follows:

12. $A = Pe^{i(2\delta_1 + \phi_1)} \cos(\theta_1 - \theta_2) = A_0 e^{i(2\delta_1 + \phi_1)}$ In equation (12) the amplitude of the light is represented by the constant $A_0$. Thus the amplitude of the light passing through the polarizer 34 does not change with the applied stress. The phase of the light is represented in equation (12) by the factor multiplied times $i$ in the exponent of the mathematical constant e. Thus the phase of the light passing through the polarizer 34 is $2\delta_1 + \Phi_1$ and thus varies with the stress applied by both pairs of transducers. Accordingly by controlling the pairs of transducers to apply compressive stress equally and varying the stress applied equally and in the same direction, the phase of the light passing through the polarizer 34 is varied without changing the amplitude of the light. The term "direction" as used above means the polarity or sign of the variation in compression. Thus if the compression is changed in the same direction, or in other words with the same variation polarity, then when one pair of transducers increases the compression, the other pair of transducers increases the compression and vice versa. Conversely, if the compression applied by the transducers is varied in the opposite direction, or in other words with the opposite variation polarity, then when one pair of transducers increases the compression, the other pair of transducers will decrease the compression and vice versa.

In the system of FIG. 1, this independent phase modulation is achieved by applying the same signal from a source 41 to the transducers 23 and 27 to make the two transducers 23 and 27 change the compression applied to the rod 11 in the same direction by the same amount.

If $\delta_1$ is made equal to $-\delta_2$ and $\Phi_1$ is made equal to $-\Phi_2$, then the expression for the light passing through the polarizer 34 becomes:

13. $A = P[\cos\theta_1 \cos\theta_2 e^{i\phi_1} + \sin\theta_1 \sin\theta_2 e^{-i\phi_1}]$ which can be rewritten as:

14. $A = P[\cos(\theta_1 - \theta_2) \cos\Phi_1 + i\cos(\Phi_1 + \Phi_2)\sin\Phi_1]$ If $\theta_1$ and $\theta_2$ are both made equal to 45° then equation (14) simply becomes:

15. $A = P\cos\Phi_1$

If $\Phi_1$ is made equal to 45° and $\theta_2$ is made equal to $\theta_1 + 90°$ then the expression for the light passing through the polarizer 34 becomes:

16. $A = -iP\sin\Phi_1$

Thus if $\delta_1$ is made equal to $-\delta_2$ and $\Phi_1$ is made equal to $-\Phi_2$, then by making $\theta_1$ and $\theta_2$ equal to 45° or $\theta_1$ equal to 45° and $\theta_2$ equal to $\Phi_1 + 90°$, the amplitude of the light passing through the polarizer 34 can be made to vary without any variation in the phase of the signal. The apparatus in FIG. 1 cannot make the values $\delta_1$ and $\Phi_1$ of the opposite sign from $\delta_2$ and $\Phi_2$. However, since the problem is to achieve modulation or change of the amplitude without modulation or change of the phase, the values $\delta_1, \Phi_1, \delta_2$ and $\Phi_2$ may be considered to represent the changes in the phase delay which result from changes in the applied compression rather than the absolute phase delay values caused by the applied compression. Accordingly to achieve amplitude modulation without phase modulation both pairs of transducers are made to apply a predetermined compression with no signal applied to the transducers and the pair of transducers 27 and 29 are controlled to change the compression applied thereby by an amount equal to the change of compression applied by the pair of transducers 23 and 25, but in the opposite direction. This is achieved in the system of FIG. 1 by applying a signal from a source 43 to the transducers 25 and 29 with the polarities of the signals applied to the transducers selected so that when the transducer 25 increases the compression, the transducer 29 will be decreasing the compression and vice versa. Preferably both pairs of transducers apply the same compression with no signal applied.

As explained above the system of FIG. 1 will achieve phase modulation independent of amplitude modulation and also amplitude modulation independent of phase modulation by means of compression applied across the diameter of the rod 11. To get both amplitude and phase modulation $\theta_1$ and $\theta_2$ are made equal to 45° and the source 41 and 43 both apply signals to the transducers as described above; that is the signal from the source 41 applied to the transducers 23 and 27 causes the transducers 23 and 27 to change the amount of compression applied to the rod in the same direction and by the same amount, and the signal applied by the source 43 to the transducers 25 and 29 causes the transducers 25 and 29 to change the compression applied thereby the same amount but in the opposite directions. With this arrangement, $\delta_1$ may be represented by the sum of two components $\delta_{11}$ and $\delta_{12}$ and the value $\Phi_1$ may be represented by the sum of two components $\Phi_{11}$ and $\Phi_{12}$ with $\delta_{11}$ being the change in $\delta_1$ caused by the transducer 23 and $\delta_{12}$ being the change in $\delta_1$ caused by the transducer 25. Similarly, $\Phi_{11}$ would be the change in $\Phi_1$ caused by the transducer 23 and $\Phi_{12}$ is the change in $\Phi_1$ caused by the transducer 25. $\delta_2$ may then be represented as equal to $\delta_{11}-\delta_{12}$ and $\Phi_2$ may be represented as $\Phi_{11}-\Phi_{12}$. Accordingly, the light energy passing through the polarizer 34 may be represented as follows:

17. $A = \frac{1}{2} P e^{i2\delta_{11}} e^{i\phi_{11}} [e^{i\phi_{12}} + e^{-i\phi_{12}}]$ which can be reduced to:

18. $A = P e^{i(2\delta_{11}+\phi_{11})} \cos \phi_{12}$

Equation (18) shows that the light passing through the polarizer 34 has both a phase component, $2\delta_{11}+\Phi_{11}$, varying with the applied compression and an amplitude component, cosine $\Phi_{12}$, varying with the applied compression. The phase component is controlled by transducers 23 and 27 in response to the signal from source 41 and the amplitude component is controlled by transducers 25 and 29 in response to the signal from source 43.

Figure 3:
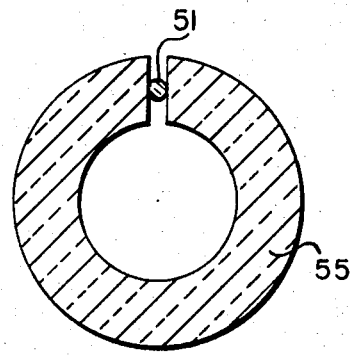
FIG. 3 illustrates an alternative transducer for applying compressive stress to the optic fiber; and, FIG. 4 illustrates still another alternative for the transducer applying compressive stress to the optic fiber.

Instead of using the two transducers 23 and 25 to apply the compression to the rod, a piezoelectric crystal in the form of a hollow cylinder could be used as illustrated in the cross sectional view of FIG. 3. As shown in this figure, the rod containing the optical fiber is designated by the reference number 51 and the cylindrical crystal is designated by the reference number 55. The rod is positioned in an axially extending slot passing through the cylindrical wall of the crystal 55. The signal voltages are applied to the inside and outside cylindrical walls of the crystal to cause it to apply a compressive stress to the rod 51 varying with the applied signal.

Figure 4:
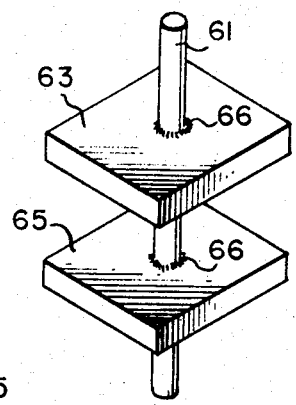

FIG. 4 shows still another arrangement for the piezoelectric crystals to apply compressive stress across diameters of the rod containing the optic fiber. As shown in this figure, the rod containing the optic fiber, designated by the reference number 61, passes through slab-shaped piezoelectric crystals 63 and 65 to which the rod 61 is bonded by rigid cement 66. Signals are applied to the sides of the crystals to cause them to resonate in the longitudinal mode so that the crystal 63 applies a compressive stress across the rod 61 at right angles to the diameter across which the crystal 65 applies a compressive stress.

Instead of using piezoelectric crystals to apply the compressive stress, magnetostrictive rods could be used or hydraulic pistons could be used. These and many other modifications may be made to the above-described specific embodiment of the invention without departing from the spirit and scope of the invention.

What is claimed is:

1. A light-modulating system comprising an optic fiber, means to introduce into one end of said fiber a polarized beam of coherent light, first compressing means to apply variable compression across a first diameter of said fiber, second compressing means to apply variable compression across a second diameter substantially angularly displaced from said first diameter, and an analyzer positioned to receive light transmitted through said fiber including means responsive to light polarized at a predetermined angle.

2. A light-modulating system as recited in claim 1 wherein said second diameter is displaced 90° from said first diameter.

3. A light-modulating system as recited in claim 1 wherein said second means applies compression to said optic fiber axially displaced along said fiber from said first means.

4. A light-modulating system as recited in claim 1 wherein there is provided means to vary the compression applied by said first and second compressing means by equal amounts and with the same variation polarity.

5. A light modulating system as recited in claim 1 wherein there is provided means to vary the compression applied by said first and second compressing means equally and with opposite variation polarity.

6. A light-modulating system as recited in claim 1 wherein there is provided means to vary a component of the compression applied by said first and second compressing means equally and with the same variation polarity and means to vary a component of the compression applied by said first and second compressing means equally and with opposite variation polarity.

7. A light-modulating system comprising means including an optic fiber for transmitting through said optic fiber polarized coherent light in a single-dielectric mode, first compressing means to apply variable compression across a first diameter of said fiber, second compressing means for applying variable compression across a second diameter of said fiber substantially angularly displaced from said first diameter, and an analyzer positioned to receive light transmitted through said fiber.

8. A light modulating system as recited in claim 7 wherein said second diameter is displaced from said first diameter by 90°.

9. A light-modulating system as recited in claim 8 further comprising means to vary the compression applied by said first and second compressing means by equal amounts and with the same variation polarity.

10. A light-modulating system as recited in claim 8 further comprising means to vary the compression applied by said compressing means by equal amounts and with opposite variation polarity.

11. A light-modulating system as recited in claim 8 further comprising means to vary a first component of the compression applied by said first and second compressing means by equal amounts with the same variation polarity and means to vary a second component of the compression applied by said first and second compressing means by equal amounts and with opposite variation polarity.

12. A light-modulating system as recited in claim 1 wherein said second compressing means applies compression to said fiber at a location displaced along the axis of said fiber from the location at which said first compressing means applies compression to said fiber.

13. A method of modulating the phase of coherent light comprising the steps of transmitting polarized coherent light through an optic fiber in a single-dielectric waveguide mode, applying compression across a first diameter of said fiber and across a second diameter of said fiber substantially angularly displaced from said first diameter, and changing the compression applied across said first and second diameters by the same amount and with the same variation polarity, and then transmitting the light through means responsive to light polarized at a predetermined angle.

14. A method of modulating the amplitude of coherent light comprising the steps of transmitting polarized coherent light through an optic fiber in a single-dielectric waveguide mode, applying compression across a first diameter of said fiber and across a second diameter of said fiber angularly displaced from said first diameter, changing the compression applied across said first second diameters by equal amounts with opposite variation polarity, and then transmitting the light through means responsive to light polarized at a predetermined angle displaced from said first and second diameters of compression.

* * * * *